United States Patent Office 3,597,390
Patented Aug. 3, 1971

3,597,390
STABILIZED HIGH TEMPERATURE
THERMOPLASTICS
Gerald W. Miller, Pittsburgh, Pa., assignor to Mobay
Chemical Company, Pittsburgh, Pa.
No Drawing. Filed Mar. 18, 1968, Ser. No. 714,026
Int. Cl. C08f 45/58; C08g 51/58; C09k 3/28
U.S. Cl. 260—45.7
11 Claims

ABSTRACT OF THE DISCLOSURE

Self-extinguishing thermoplastics stabilized against thermal degradation with a stabilizing amount of a tris-(halophenyl)phosphite, a tris - (halo - alkylphenyl)phosphite, a tris-(halonaphthyl)phosphite, a tris-(halo-alkylnaphthyl)phosphite, a tris-(halophenyl)phosphine, a tris-(halo-alkylphenyl)phosphine, a tris-(halonaphthyl)phosphine, a tris-(halo-alkylnaphthyl)phosphine, a poly(halophenylphosphite) a poly(halonaphthylphosphite), a poly-(halo-alkylphenylphosphite), a poly(halo-alkylnaphthylphosphite) and mixtures thereof.

---

This invention relates to stabilized thermoplastic polymeric materials and more particularly to polycarbonates which are flame-resistant and stabilized against thermal degradation.

Polycarbonate materials are generally prepared by reacting di(hydroxyaryl) alkanes, di(hydroxyaryl) sulphones, di-(hydroxyaryl)sulphoxides, di-(hydroxyaryl) sulphites, di-(hydroxyaryl) ethers or other aromatic dihydroxy compounds or mixtures thereof with phosgene, haloformates or diesters of carbonic acid. In general, polycarbonates produced from these and other conventional materials according to conventional processes usually have a yellow or amber color at the time they are produced, or else they acquire such a color upon standing. Further, the polycarbonate plastic often becomes discolored while being reheated during casting or other shaping processes in the presence of air, thus making it undesirable for the preparation of shaped articles where it is important that the material from which the article is prepared is colorless.

Although polycarbonate plastics have been classified as self-extinguishing materials by ASTM standards, and although such polymers have a relatively high temperature resistance, polycarbonate plastics are still unsuitable for many applications because they are not sufficiently flame-resistant. In order to cure this deficiency it has been proposed to use some type of high temperature material such as fiberglass with the polycarbonate to increase its temperature resistance. Although such expedients have been known to increase the heat resistance of polycarbonates by about 10° F., such a result is not sufficient to render polycarbonates sufficiently flame-proof for those applications in which non-flammability is essential. It has also been proposed to coat polycarbonate parts with a heat resistant material such as a phenolic, an epoxy or even with metal coating of various types. However, such expedients leave much to be desired when the application requires that the integral polymer itself be flame-proof or flame-resistant.

It is therefore an object of this invention to provide a thermoplastic material which is devoid of the foregoing disadvantages.

It is also an object of this invention to provide stabilizers for polycarbonates which are equally efficacious for other thermoplastic materials.

Another object of the invention is to provide a method for stabilizing thermoplastics in general and polycarbonates in particular against thermal degradation.

Still another object of this invention is to provide a non-flammable or flame-proof thermoplastic composition.

A further object of this invention is to provide a polycarbonate plastic stabilized against thermal degradation and the resulting discoloration attendant thereon.

A still further object of the invention is to provide a method for preventing the discoloration of a thermoplastic due to thermal degradation.

The foregoing objects and others are accomplished in accordance with this invention, generally speaking, by providing self-extinguishing, class one type thermoplastic materials in general and polycarbonates in particular stabilized against thermal degradation by having incorporated therein a stabilizing amount of a tris-(halophenyl)phosphite, a tris-(halonaphthyl)phosphite, a tris(halophenyl) phosphine, a tris-(halonaphthyl)phosphine, alkyl substituted homologues of the foregoing compounds wherein the alkyl substitution is on the phenyl or naphthyl ring such as in a tris-(halo-alkylphenyl)phosphite, a tris-(halo-alkylnaphthyl)phosphite, a tris-(halo-alkylphenyl)phosphine, a tris-(halo-alkylnaphthyl)phosphine and the like wherein the alkyl group preferably has 1 to 18 carbon atoms, the polyhalophenylphosphite, the polyhalonaphthyl phosphite

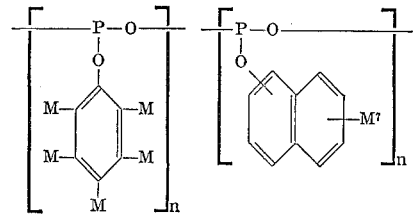

and mixtures thereof wherein halo is any suitable halogen atom such as chlorine, fluorine, bromine, iodine and the like and mixtures thereof, but preferably chlorine or bromine, at least one halo substituent on each phenyl or naphthyl ring being chlorine or bromine; M is the same or different hydrogen, alkyl radical, preferably having from 1 to 18 carbon atoms or any suitable halogen as described for halo, at least one of the substituents M on each phenyl or naphthyl ring being chlorine or bromine, and $n$ is any suitable integer, the upper limits of which are governed by the ease of compatibility of the polyhalophosphite polymer with the thermoplastic with which it is to be blended as desired but preferably, $n$ is an integer of from about 2 to about 50.

The thermoplastics in general, and polycarbonates in particular, to be stabilized in accordance with this invention are self-extinguishing class one type materials which resist thermal degradation and therefore do not become discolored under continued exposure to heat. In addition, a synergistic effect has been observed with the halophosphite stabilizers of the instant invention inasmuch as only very small quantities of the stabilizers are necessary in order to yield a self-extinguishing thermoplastic polymer which is resistant to thermal degradation, particularly during extrusion processes. The source of the synergism is not understood but may derive from the combination of the trivalent phosphorus atom and the halogenated aryl groups.

Although the stabilizers of this invention may be used in any desired stabilizing concentration, quantities of from about 0.1% to about 25% are generally sufficient to render a thermoplastic self-extinguishing and resistant to thermal degradation and preferably, from about 4% to about 10% of the stabilizer is used. It must be emphasized however, that greater quantities of the stabilizer of this invention may be employed and that the upper limit of the concentration range to be used is circumscribed only by economics. Particularly when being used to stabilize polycarbonates, the halophosphite stabilizers of this invention may be incorporated into a polycarbonate polymer without the corresponding deleterious effects of the mechanical properties of the polycarbonate which are observed when other thermal stabilizers such as trialkylphosphites have been used. It is therefore entirely unexpected that the stabilizers of this invention will render a polycarbonate self-extinguishing and resistant to thermal degradation while at the same time having no deleterious effect on the physical and mechanical properties of the polycarbonate polymer itself, even when used at high concentrations.

The halophosphites of this invention may be mixed with the thermoplastic polymer to be stabilized by any suitable means. A convenient method for adding the halophosphite to a polycarbonate is to spray a solution thereof onto granules of the polymer. The halophosphites may also be introduced during the preparation of the polymer, particularly if the polymer is a polycarbonate; for example, they can be added to polycarbonates produced by an esterification process while the esterification is being effected. When a polycarbonate is produced by the phosgenation of a dihydroxy compound, a more or less viscous solution is usually formed which, after being washed free of electrolytes, can be mixed with the halophosphites of this invention or a solution thereof to obtain an essentially homogeneous dispersion. It is sometimes advantageous to add the halophosphite to the thermoplastic polymer by passing already shaped articles such as bristles spun from the polymer through a bath containing the dissolved halophosphite in which case a thin halophosphite film is deposited on the bristles upon evaporation of the solvent. Further, the stabilizers of this invention may be thoroughly distributed in a resin by simply mixing the materials together by any of the variety of methods normally employed for the incorporation of plasticizers or fillers into thermoplastic polymers including, but not limited to mixing rolls, dough mixers, Banbury mixers, extruders and other mixing equipment.

Any suitable polycarbonate may be stabilized in accordance with this invention. For example, the carbonate polymers may be prepared by reacting a dihydric phenol with carbonate precursors such as phosgene, a haloformate or a carbonate ester. Some suitable reactants and processes for the preparation of polycarbonates are set forth, for example, in Canadian Pats. 578,585; 578,795; 594,805 and U.S. Pats. 3,028,365; 2,970,131; 2,991,273; 2,999,835; 3,014,891 as well as in Chemistry and Physics of Polycarbonates by Herman Schnell and Polycarbonates by William F. Christopher and Daniel W. Fox.

Generally, all polycarbonate plastics are subject to discoloration regardless of the compounds from which they are formed or the process used in forming them, and all polycarbonate resins can be treated according to the process of this invention, particularly all high-molecular weight, substantially linear themoplastic polycarbonates. As indicated hereinbefore, the polycarbonate plastic can be produced from a dihydroxy diaryl alkane and phosgene or a diester of carbonic acid such as, for example, by the process disclosed by Schnell et al. in Canadian Pat. 578,585. Another suitable method for preparing the polycarbonate plastic to be stabilized in accordance with this invention is described in U.S. Pat. 3,271,367 which discusses dihydroxydiaryl sulphones. Other polycarbonates which can be stabilized against discoloration in accordance with this invention are disclosed in U.S. Pats. 2,999,846 and 3,062,781. Since the foregoing Canadian and U.S. patents are incorporated herein by reference, a detailed description of methods for making polycarbonates need not be set forth herein. Suffice it to say that any and all polycarbonates may be treated according to the process of this invention, particularly those which are of the greatest commercial importance and which have molecular weights of at least about 10,000 and most preferably between about 25,000 and 150,000.

Any other suitable thermoplastic resin may be stabilized in accordance with this invention. For example, some other polymeric materials which can be so stabilized are polysulfones, polyamides, polypropylene oxides, polyethylene oxides, Polymer 360, a product of the Minnesota Mining and Manufacturing Corporation, polyolefins such as polyethylene, polypropylene and the like, polyethylene terephthalate and polyesters and copolyesters in general, as well as any other type of thermoplastic material which is susceptible to thermal degradation and which is flammable.

In all of these cases, any amount of the haloarylphosphites of this invention will stabilize the polymer against discoloration, and will even reduce and in some cases do away with all of the discoloration which usually takes place in polycarbonate polymers after they are formed. Some specific examples of haloarylphosphites which may be used in the practice of this invention are, for example, tris-(2,4,6-tribromophenyl)phosphite,
tris-(2,4,6-trichlorophenyl)phosphite,
tris-(2,6-dibromo-4-chlorophenyl)phosphite,
tris-(2,6-dichloro-4-bromophenyl)phosphite,
tris-(2,4,6-tribromophenyl)phosphine,
tris-(2,4,6-trichlorophenyl)phosphine,
tris-(2,4-dibromo-4-chlorophenyl)phosphine,
tris-(2,6-dichloro-4-bromophenyl)phosphine,
tris-(4-bromophenyl)phosphine,
tris-(4-chlorophenyl)phosphine,
tris-(3,5-dibromotolyl)phosphine,
tris-(3,5-dichlorotolyl)phosphine,
tris-(3,5-dibromo-2,6-difluorotolyl)phosphine,
tris-(2-iodo-3-bromotolyl)phosphine,
tris-(2,3,5,6-tetrabromotolyl)phosphine,
tris-(2,3,5,6-tetrachlorotolyl)phosphine,
(3,5-dibromotolyl, 3,5-dichlorotolyl, 3,5-diiodotolyl) phosphine,
tris-(2-bromotolyl)phosphine,
tris-(3-bromotolyl)phosphine,
tris-(2-chlorotolyl)phosphine,
tris-(3-chlorotolyl)phosphine,
tris-(2-bromocumenyl)phosphine,
tris-(2-chlorocumenyl)phosphine,
tris-(2,6-dibromocumenyl)phosphine,
tris(2,6-dichlorocumenyl)phosphine,
tris-(2,3,6-tribromocumenyl)phosphine,
tris-(2,3,6-trichlorocumenyl)phosphine,
tris-(2-bromo-6-iodocumenyl)phosphine,
tris-(2-bromo-6-fluorocumenyl)phosphine,
tris-(2,6-difluoro-3-bromocumenyl)phosphine,
(2-bromocumenyl, 2-chlorocumenyl, 2,6-diiodocumenyl) phosphine,
tris-(3,5-dibromotolyl)phosphite,
tris-(3,5-dichlorotolyl)phosphite,
tris-(3,5-dibromo-2,6-difluorotolyl)phosphite,
tris-(2-iodo-3-bromotolyl)phosphite,
tris-(2,3,5,6-tetrabromotolyl)phosphite,
tris-(2,3,5,6-tetrachlorotolyl)phosphite,
(3,5-dibromotolyl, 3,5-dichlorotolyl, 3,5-diiodotolyl) phosphite,
tris-(2-bromotolyl)phosphite,
tris-(3-bromotolyl)phosphite,
tris-(2-chlorotolyl)phosphite,
tris-(3-chlorotolyl)phosphite, tris-(2-bromocumenyl)phosphite,
tris-(2-chlorocumenyl)phosphite,
tris-(2,6-dibromocumenyl)phosphite,
tris-(2,6-dichlorocumenyl)phosphite,
tris-(2,3,5,6-tetrabromocumenyl)phosphite,
tris-(2,3,5,6-tetrachlorocumenyl)phosphite,
tris-(2-bromo-6-iodocumenyl)phosphite,
tris-(2-bromo-6-fluorocumenyl)phosphite,
tris-(2,6-difluoro-3-bromocumenyl)phosphite,
(2-bromocumenyl, 2-chlorocumenyl, 2,6-diiodocumenyl) phosphite,
tris-(2,6-difluoro-4-bromophenyl)phosphite,
tris-(2-iodo-4,6-dichlorophenyl)phosphite,
[(2,4,6-tribromophenyl), (2,4,6-trichlorophenyl), (2,4,6-triiodophenyl)]phosphite,
[(2,4,6-tribromophenyl), (2,6-dichloro-4-bromophenyl), (4-iodophenyl)]phosphite,
tris-(2-chloro-a-naphthyl)phosphite,
tris-(4-bromo-a-naphthyl)phosphite,
tris-(2,4-dichloro-a-naphthyl)phosphite,
tris-(2,4-dibromo-a-naphthyl)phosphite,
tris-(1-bromo-b-naphthyl)phosphite,
tris-(4-chloro-b-naphthyl)phosphite,
tris-(2,5-dichloro-a-naphthyl)phosphite,
tris-(1,4-dibromo-b-naphthyl)phosphite,
tris-(2-chloro-7-bromo-a-naphthyl)phosphite,
tris-(1,5-dibromo-b-naphthyl)phosphite,
tris-(1-bromo-7-chloro-b-naphthyl)phosphite,
(2-bromo-a-naphthyl-4-chloro-a-naphthyl-5-iodo-a-naphthyl)phosphite,
(1,4-dibromo-b-naphthyl, 1,5-dichloro-b-naphthyl, 1-fluoro-7-iodo-b-naphthyl)phosphite,
tris-(heptabromonaphthyl)phosphite,
tris-(heptachloronaphthyl)phosphite,
tris-(2,4,6-tribromonaphthyl)phosphite,
tris-(2,3,6,7-tetrachloronaphthyl)phosphite,
tris-(2,3,6,7-tetrabromo-4,5-diiodonaphthyl)phosphite,
tris-(2,6-difluoro-4-bromophenyl)phosphine,
tris-(2-iodo-4,6-dichlorophenyl)phosphine,
[(2,4,6-tribromophenyl), (2,4,6-trichlorophenyl), (2,4,6-triiodophenyl)]phosphine,
[(2,4,6-tribromophenyl), (2,6-dichloro-4-bromophenyl), (4-iodophenyl)]phosphine,
tris-(2-chloro-a-naphthyl)-phosphine,
tris-(4-bromo-a-naphthyl)phosphine,
tris-(2,4-dichloro-a-naphthyl)phosphine,
tris-(2,4-dibromo-a-naphthyl)phosphine,
tris-(1-bromo-b-naphthyl)phosphine,
tris-(4-chloro-b-naphthyl)phosphine,
tris-(2,5-dichloro-a-naphthyl(phosphine,
tris-(1,4-dibromo-b-naphthyl)phosphine,
tris-(2-chloro-7-bromo-a-naphthyl)phosphine,
tris-(1,5-dibromo-b-naphthyl)phosphine,
tris-(1-bromo-7-chloro-b-naphthyl)phosphine,
(2-bromo-a-naphthyl-4-chloro-a-naphthyl-5-iodo-a-naphthyl)phosphine,
(1,4-dibromo-b-naphthyl, 1,5-dichloro-b-naphthyl, 1-fluoro-7-iodo-b-naphthyl)phosphine,
tris-(heptabromonaphthyl)phosphine,
tris-(heptachloronaphthyl)phosphine,
tris-(2,4,6-tribromonaphthyl)phosphine,
tris-(2,3,6,7-tetrachloronaphthyl)phosphine,
tris-(2,3,6,7-tetrabromo-4,5-diiodonaphthyl)phosphine.

Some specific polyhalophenylphosphites which may be used in the practice of this invention have the formula

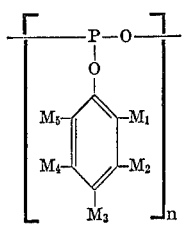

wherein the substituents M and the subscript $n$ have the following values, for example:

| $M_1$ | $M_2$ | $M_3$ | $M_4$ | $M_5$ | $n$ |
|---|---|---|---|---|---|
| Br | H | Br | H | Br | 10 |
| Cl | H | Cl | H | Cl | 10 |
| $CH_3$ | H | Cl | H | $CH_3$ | 50 |
| $C_3H_5$ | H | Br | H | $C_3H_5$ | 33 |
| Br | H | F | H | Br | 3 |
| H | Cl | F | Cl | H | 45 |
| Cl | H | F | H | Cl | 45 |
| Br | Br | Br | Br | Br | 40 |
| Br | Br | F | Br | Br | 30 |
| Cl | Cl | Cl | Cl | Cl | 30 |
| Cl | Cl | I | Cl | Cl | 25 |
| Br | Br | H | Br | Br | 25 |
| Cl | Cl | H | Cl | Cl | 50 |
| Br | Br | $C_{18}H_{35}$ | Br | Br | 2 |
| Cl | Cl | $C_{18}H_{35}$ | Cl | Cl | 50 |
| $C_4H_7$ | H | Br | H | $C_4H_7$ | 2 |
| $C_8H_{15}$ | H | Cl | H | $C_8H_{15}$ | 20 |
| H | H | Br | H | H | 17 |
| H | H | Cl | H | H | 15 |
| H | Br | H | Br | H | 11 |
| H | Cl | H | Cl | H | 6 |
| Br | I | Br | Br | Br | 2 |
| Cl | I | Cl | Cl | Cl | 2 |

Some specific polyhalonaphthylphosphites which may be used have the formula:

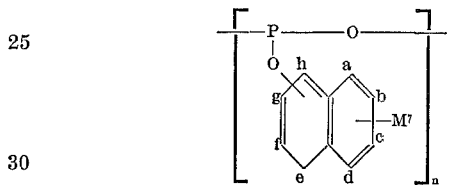

wherein the substituents M and the subscript $n$ have the following values and positions, for example:

| a | b | c | d | e | f | g | h | n |
|---|---|---|---|---|---|---|---|---|
| O— | Br | H | Br | H | H | H | H | 5 |
| O— | Cl | H | H | H | H | H | H | 3 |
| O— | Br | H | H | H | H | H | H | 12 |
| O— | Br | Br | I | Br | Br | Br | H | 10 |
| O— | F | H | Br | H | F | H | Br | 6 |
| H | O— | H | Br | Br | H | H | H | 5 |
| H | O— | H | Cl | Cl | H | H | H | 6 |
| O— | H | H | Br | Br | H | H | H | 2 |
| O— | H | H | Cl | Cl | H | H | H | 2 |
| O— | Br | H | Br | Br | H | Br | H | 8 |
| O— | Cl | H | Cl | Cl | H | Cl | H | 4 |
| O— | Br | Br | Br | Br | Br | Br | Br | 25 |
| O— | Cl | Cl | Cl | Cl | Cl | Cl | Cl | 20 |
| Br | O— | Br | Br | Br | Br | Br | Br | 27 |
| Cl | O— | Cl | Cl | Cl | Cl | Cl | Cl | 22 |
| Cl | O— | H | $C_{10}H_9$ | $C_{10}H_9$ | H | Cl | Cl | 18 |
| Br | O— | Br | $CH_3$ | $CH_3$ | Br | Br | Br | 20 |
| $CH_3$ | O— | Br | $C_3H_5$ | $C_3H_5$ | Br | Br | Br | 15 |
| O— | Cl | Cl | $C_{18}H_{35}$ | Cl | Cl | Cl | Cl | 50 |
| O— | Br | Br | $CH_3$ | $CH_3$ | Br | Br | Br | 45 |
| Cl | O— | Cl | Cyclohexyl. | Cl | Cl | Cl | Cl | 35 |
| Br | O— | Br | Cyclopentyl. | Br | Br | Br | Br | 27 |
| Cl | O— | H | Cl | Cl | H | Cl | H | 9 |
| Br | O— | H | Br | Br | H | Br | H | 16 |

Although an extensive listing of compounds has been set forth, it is to be understood that these are merely exemplary and that any and all compounds within the scope of the generic formulae and classes of compounds set forth herein are operable and contemplated.

The phosphite and phosphine stabilizers of this invention may be prepared by any suitable method such as, for example, any of those methods outlined in Phosphorus and its Compounds by Van Wazer, Interscience Publishers, Inc., N.Y.; Organophosphorus Monomers and Polymers, Geffer, Associated Technical Services, Inc., N.J., Organo-Phosphorus Compounds, G. M. Kosolapoff, N.Y., and the like.

The stabilized thermoplastics of this invention may be used in any application for which thermoplastic materials are eminently suitable. For example, they may be used for preparing gaskets, tubing and other materials such as films, foils, coatings, fibers, and the like. Because of their improved properties, their self-extinguishing characteristics and their ability to resist thermal degradation, the polycarbonates of this invention are eminently suitable for any of the above applications as well as any in which the polymer will be subjected to heat.

The invention is further illustrated but is not intended to be limited by the following examples in which all parts and percentages are by weight unless otherwise specified.

EXAMPLES 1–7

The stabilizer identified in Table I in the quantity set forth therein is mixed with the indicated quantity of a polycarbonate having the indicated molecular weight and prepared by the phosgenation of 2,2-(4,4'-dihydroxydiphenyl) propane, and the mixture is extruded and pelletized. The extruded pellets retain the color of the virgin polycarbonate. After being molded into 1/16", 1/8" and 1/4" bars, each configuration passes the UL flammability test as a Class I, self-extinguishing material.

TABLE I

| Additive | Quantity, parts | PC, quantity, parts | Mol. wt. | UL flammability test 1/16" | 1/8" | 1/4" |
|---|---|---|---|---|---|---|
| Tris-(2,4,6-tribromophenyl phosphite) | 70 | 430 | 30,000 | + | + | + |
| Tris-(2,4-dibromophenyl) phosphine | 10 | 90 | 60,000 | + | + | + |
| Pentabromophenyl-poly-meta-phosphite | 14 | 86 | 35,000 | + | + | + |
| Tris-(pentabromophenyl) phosphite | 1 | 99 | 30,000 | − | + | + |
| Tris-(2,4,7-tribromo-a-naphthyl) phosphite | 8 | 92 | 40,000 | + | + | + |
| Tris-(4-fluoro-2,6-dibromophenyl) phosphite | 10 | 90 | 30,000 | + | + | + |
| Tris-(4-chloro-3-methyl 2,6-dibromophenyl) phosphite | 2 | 98 | 30,000 | − | + | + |

EXAMPLES 8–16

The stabilizer identified in Table II in the quantity set forth therein is mixed with the indicated quantity of the described polymer having the molecular weight set forth in the table, and the mixture is extruded and pelletized. The extruded pellets retain the color of the virgin polymer. After being molded into 1/16", 1/8" and 1/4" bars, each configuration passes the UL flammability test as a Class I, self-extinguishing material.

TABLE II

| Additive | Quantity, parts | Polymer | Quantity, parts | Mol. wt. | UL Flammability test 1/16" | 1/8" | 1/4" |
|---|---|---|---|---|---|---|---|
| Tris-(pentabromophenyl) phosphite | 10 | Polyamide [1] | 90 | 42,000 | + | + | + |
| Tris-(tribromophenyl) phosphite | 25 | Polystyrene | 75 | 200,000 | + | + | + |
| Tris-(4-a,a',a''-trifluoromethyl-2,6-dibromophenyl) phosphite | 25 | Polyurethane [2] | 75 | 60,000 | + | + | + |
| Tris-(pentabromophenyl) phosphine oxide | 22 | Poly-(styrene-acrylonitrile) | 78 | 120,000 | + | + | + |
| Tris-(2,4,6-tri-bromophenyl) phosphite | 20 | Polymethyl methacrylate | 80 | 600,000 | + | + | + |
| Do | 5 | Polysulfone | 95 | 41,000 | + | + | + |
| Do | 7 | Polyphenylene oxide | 93 | 50,000 | + | + | + |
| Do | 10 | Noryl [3] | 90 | 50,000 | + | + | + |
| Tris-(pentabromophenyl) phosphite | 10 | Polypropylene | 90 | 100,000 | + | + | + |

[1] The condensation product of hexamethylene diamine and adipic acid.
[2] The reaction product of 4,4'-diphenylmethane diisocyanate, 1,4-butanediol and adipic acid.
[3] A mixture of polyphenylene oxide and polystyrene (Product of General Electric).

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

What is claimed is:

1. A thermoplastic composition which is self-extinguishing and stabilized against thermal degradation which comprises a polyamide, polystyrene, polycarbonate, poly-(styrene-acrylonitrile), polymethylmethacrylate, polysulfone, polyphenylene oxide, polyolefin, polyester or polyolefin oxide containing a stabilizing amount of a poly-(halophenylphosphite), a poly(halonaphthylphosphite), a tris-(halonaphthyl)phosphine, a tris-(halophenyl)phosphine, a tris-(haloalkylphenyl)phosphite, a tris-(haloalkylnaphthyl)phosphie, a tris-(halo-alkylphenyl)phosphine or a tris-(halo-alkylnaphthyl)phosphine wherein the alkyl groups have 1 to 18 carbon atoms, and mixtures thereof.

2. A thermoplastic composition which is self-extinguishing and stabilized against thermal degradation which comprises a thermoplastic resin containing a stabilizing amount of tris-(2,6-dichloro-4-bromophenyl)phosphite or tris-(2,6-dibromo-4-chlorophenyl)phosphite.

3. The composition of claim 1 wherein the thermoplastic is a polycarbonate.

4. The composition of claim 1 containing from about 0.1% to about 25% of the stabilizer.

5. A thermoplastic composition which is self-extinguishing and stabilized against thermal degradation which comprises a thermoplastic resin containing a stabilizing amount of tris(2,4,6-tribromophenyl)phosphine or tris-(2,4,6-trichlorophenyl)phosphine.

6. A thermoplastic composition which is self-extinguishing and stabilized against thermal degradation which comprises a thermoplastic resin containing a stabilizing amount of

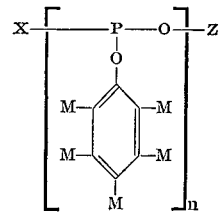

wherein M is a hydrogen atom, alkyl group having from 1 to 18 carbon atoms, or halogen atom, at least one M on each ring being chlorine or bromine, $n$ is an integer of from 2 to 50, X is a halogen atom or an OH group and Z is a hydrogen atom.

7. A thermoplastic composition which is self-extinguishing and stabilized against thermal degradation which comprises a thermoplastic resin containing a stabilizing amount of

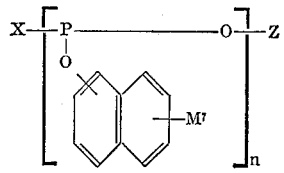

wherein M is a hydrogen atom, alkyl group having from 1 to 18 carbon atoms or halogen atom, at least one M on each naphthyl ring being chlorine or bromine, $n$ is an integer of from 2 to 50, X is a halogen atom or an OH group and Z is a hydrogen atom.

8. A thermoplastic composition which is self-extinguishing and stabilized against thermal degradation which comprises a thermoplastic resin containing a stabilizing amount of a poly(halophenylphosphite), a poly(halonaphthylphosphite), a tris-(halonaphthyl)phosphine, a tris-(halophenyl)phosphine, a tris - (haloalkylphenyl)phosphine or a tris-(halo-alkylnaphthyl)phosphine wherein the alkyl groups have 1 to 18 carbon atoms, and mixtures thereof.

9. A thermoplastic composition which is self-extinguishing and stabilized against thermal degradation which comprises a polyurethane containing a stabilizing amount of a tris-(halonaphthyl)phosphine, a tris-(halophenyl)phosphine, a tris-(haloalkylphenyl)phosphine, or a tris-(haloalkylnaphthyl)phosphine wherein the alkyl groups have 1 to 18 carbon atoms and mixtures thereof.

10. The composition of claim 9 containing from about 0.1% to about 25% of the stabilizer.

11. The composition of claim 1 wherein the stabilizer is tris-(2,4,6-trichlorophenyl)phosphite.

References Cited

UNITED STATES PATENTS

| 3,157,613 | 11/1964 | Anderson et al. | 260—30.6 |
| 3,208,959 | 9/1965 | Gmitter | 260—2.5 |
| 3,216,960 | 11/1965 | Monroe | 260—28.5 |
| 3,255,145 | 6/1966 | Graham | 260—30.6 |
| 3,344,112 | 9/1967 | Birum et al. | 260—45.7 |
| 3,412,052 | 11/1968 | Taylor et al. | 260—2.5 |
| 3,456,041 | 7/1969 | Burk et al. | 260—961 |
| 3,305,520 | 2/1967 | Fritz et al. | 260—45.7 |
| 3,334,064 | 8/1967 | Bailey | 260—45.7 |
| 3,334,154 | 8/1967 | Kim | 260—860 |
| 3,357,942 | 12/1967 | Jackson, Jr. et al. | 260—45.7 |
| 3,375,304 | 3/1968 | Larrison | 260—929 |
| 3,382,207 | 5/1968 | Jaquiss | 260—45.7 |

FOREIGN PATENTS

| 1,076,608 | 7/1967 | Great Britain | 260—45.7 |

DONALD E. CZAJA, Primary Examiner

R. A. WHITE, Assistant Examiner

U.S. Cl. X.R.

260—47XA